United States Patent [19]

Kurei

[11] Patent Number: 5,307,111
[45] Date of Patent: Apr. 26, 1994

[54] OBJECT DISTANCE MEASURING APPARATUS OF CAMERA

[75] Inventor: Hiroshi Kurei, Tokyo, Japan

[73] Assignee: Asahi Kogaku Kogyo Kabushiki Kaisha, Tokyo, Japan

[21] Appl. No.: 864,653

[22] Filed: Apr. 7, 1992

[30] Foreign Application Priority Data

Apr. 9, 1991 [JP] Japan .................. 3-161972

[51] Int. Cl.$^5$ .................. G03B 3/00; G03B 37/00
[52] U.S. Cl. .................. 354/402; 354/159; 354/94
[58] Field of Search .................. 354/432, 159, 94–99, 354/402, 403, 406

[56] References Cited

U.S. PATENT DOCUMENTS

| 4,527,881 | 7/1985 | Sugawara .................. 354/432 |
| 4,611,895 | 9/1986 | Seely .................. 354/159 X |
| 4,782,357 | 11/1988 | Hayakawa et al. .................. 354/432 X |
| 4,855,780 | 8/1989 | Hayakawa .................. 354/432 |
| 4,959,676 | 9/1990 | Matsuda et al. .................. 354/432 X |
| 4,974,007 | 11/1990 | Yoshida .................. 354/402 |
| 5,010,357 | 4/1991 | Misawa .................. 354/159 |
| 5,021,818 | 6/1991 | Satoh et al. .................. 354/432 X |
| 5,051,767 | 9/1991 | Honma et al. .................. 354/406 |
| 5,066,971 | 11/1991 | Kodaira .................. 354/159 X |

FOREIGN PATENT DOCUMENTS 4109566 9/1991 Fed. Rep. of Germany .
2244144 11/1991 United Kingdom .

OTHER PUBLICATIONS

French Search Report and Annex. Boeykens J. W. Jan. 22, 1993.

Primary Examiner—Michael L. Gellner
Assistant Examiner—Jae N. Noh
Attorney, Agent, or Firm—Sandler, Greenblum & Bernstein

[57] ABSTRACT

An object distance measuring apparatus of a camera including an image area size varying device which varies the size of an image area, a multi-point measuring device having a plurality of object distance measuring elements to meter the object distances of an object in a large picture plane at different measuring points, and an object distance measuring element selecting device which selects a plurality of outputs of the object distance measuring elements in accordance with the size of the image area selected by the image area size varying device.

13 Claims, 4 Drawing Sheets

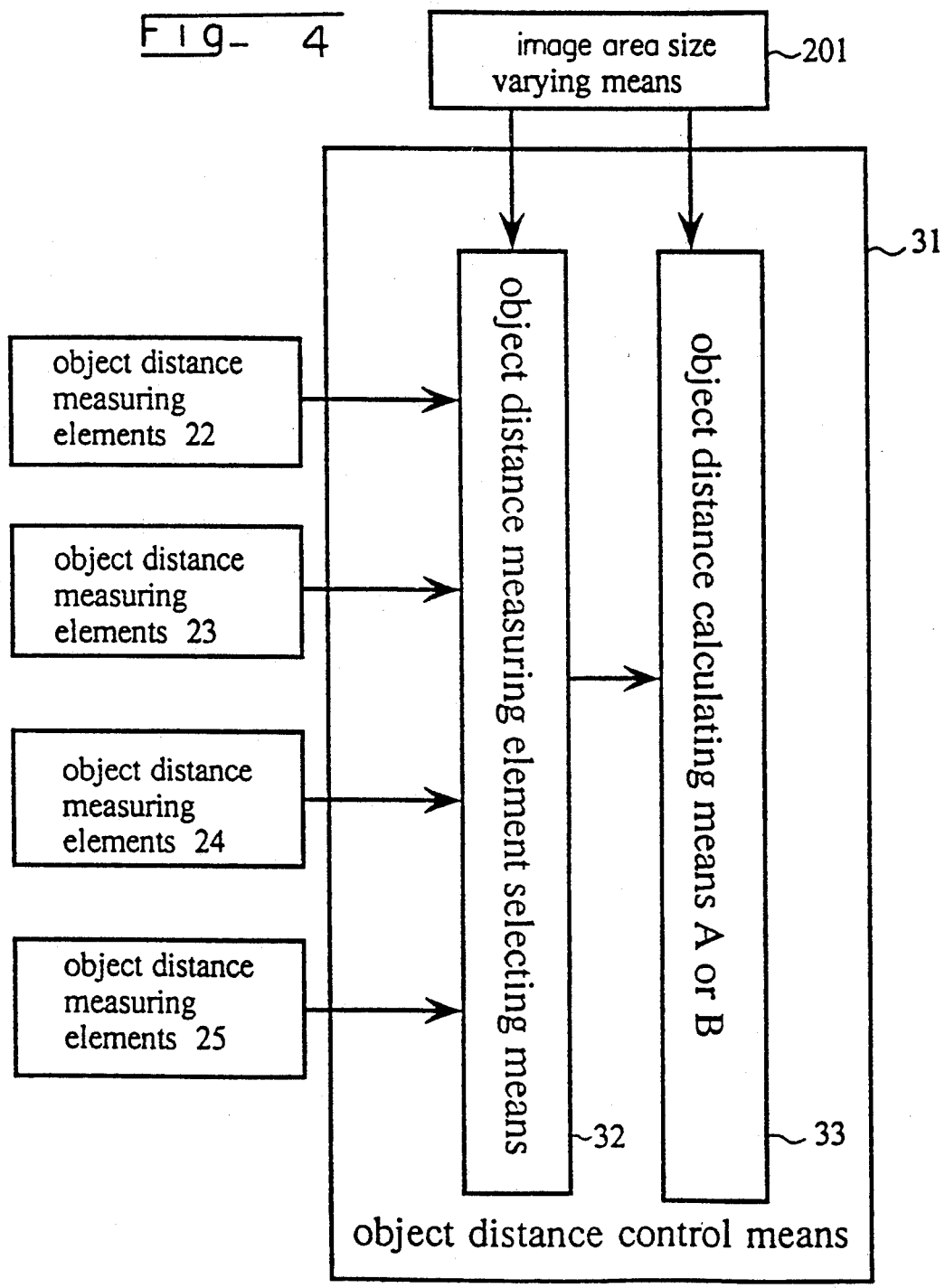

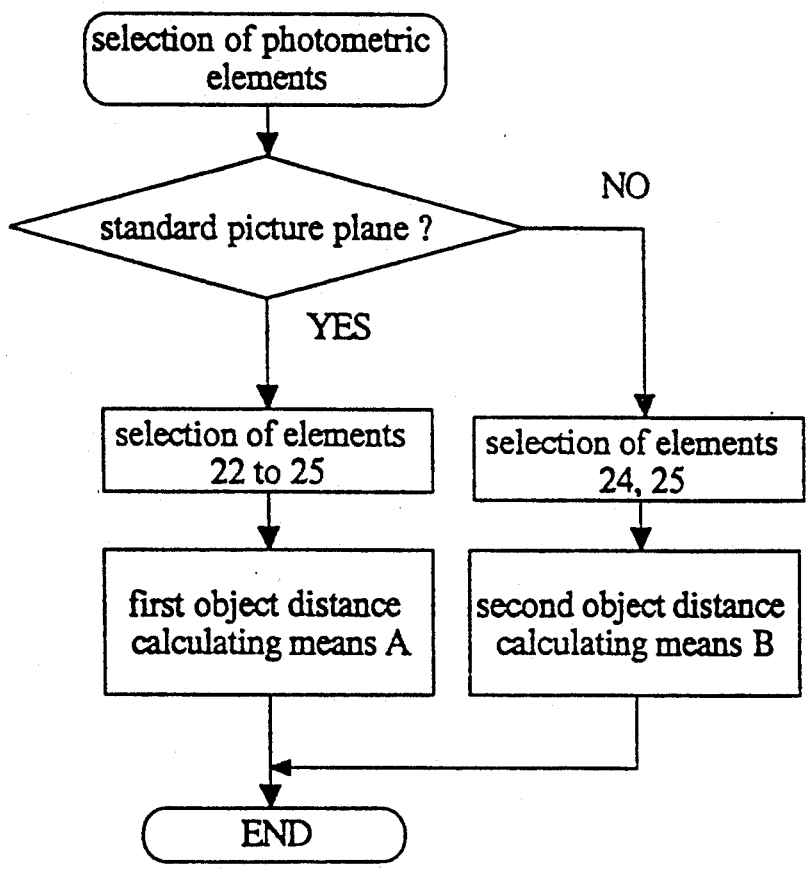

OBJECT DISTANCE MEASURING APPARATUS OF CAMERA

BACKGROUND OF THE INVENTION

1. Field of the Invention

The present invention relates to an apparatus for measuring an object's distance, wherein the apparatus is used in a camera having a multi-point object distance measuring device (a multi-point measuring device) and a picture plane size varying device.

2. Description of Related Art

A camera is known to have a picture plane size varying device which can change the size of an image area, for example, between a large (standard) size image area and either a half-size image area or a panoramic image area. In such a known camera having an image area size varying device, an object's distance is measured by an object distance measuring device which measures the object's distance from the camera, corresponding to the image at the center of the image area or the vicinity thereof. Namely, the object distance to be measured is the distance between an object to be taken, corresponding to an image at the center of the image area (including the vicinity thereof) and the camera, resulting in little or no possibility of error in measurement.

Recently, cameras having a multi-point measuring device, which measures the object distance corresponding to a plurality of images at various measuring points (measuring zones) of the image area, have been on the market. Such a multi-point measuring device is usually realized by a divided measuring device (evaluation measuring device) in which the measurements at a plurality of measuring points are evaluated to determine an optimum exposure condition.

Generally speaking, a pattern of the measuring zones is determined, based on those in the standard image area (large image area). Therefore, if the image area is changed (i.e., if the size of the image area is changed), the measuring zones will not correspond to the image area and a measurement error will likely result.

SUMMARY OF THE INVENTION

The primary object of the present invention is to provide an object distance measuring apparatus to be used in a camera having a multi-point measuring device and an image area varying device, wherein a precise measurement of the object distance, corresponding to the selected image area, can be effected.

To achieve the object mentioned above, according to the present invention, there is provided an object distance measuring apparatus of a camera including an image area size varying device for varying the size of an image area, a multi-point measuring device having a plurality of object distance measuring elements for measuring object distances of an object in a large image area at different measuring points, and an object distance measuring element selecting device for selecting a plurality of outputs of the object distance measuring elements of the multi-point measuring device in accordance with the size of the image area selected by the image area size varying device.

According to another aspect of the present invention, there is provided an object distance measuring apparatus of a camera including an image area size varying device for varying the size of an image area and a multi-point measuring device having a plurality of object distance measuring elements for measuring distances of an object in a large image area at different measuring points. When a small picture plane is selected by the image area size varying means, at least a part of at least one of the object distance measuring elements becomes external to the small image area.

The present disclosure relates to subject matter contained in Japanese Patent Application No. HEI3-161972 (filed on Apr. 9, 1991) which is expressly incorporated herein by reference in its entirety.

BRIEF DESCRIPTION OF THE DRAWINGS

The invention will be described below in detail with reference to the accompanying drawings, in which:

FIG. 4 is a block diagram of an object distance measuring apparatus according to the present invention;

FIG. 5 is a flow chart of a main operation of an object distance measuring apparatus according to the present invention; and, FIG. 6 is a plan view of another embodiment of an object distance measuring sensor according to the present invention.

DESCRIPTION OF THE PREFERRED EMBODIMENTS

Figure 1:
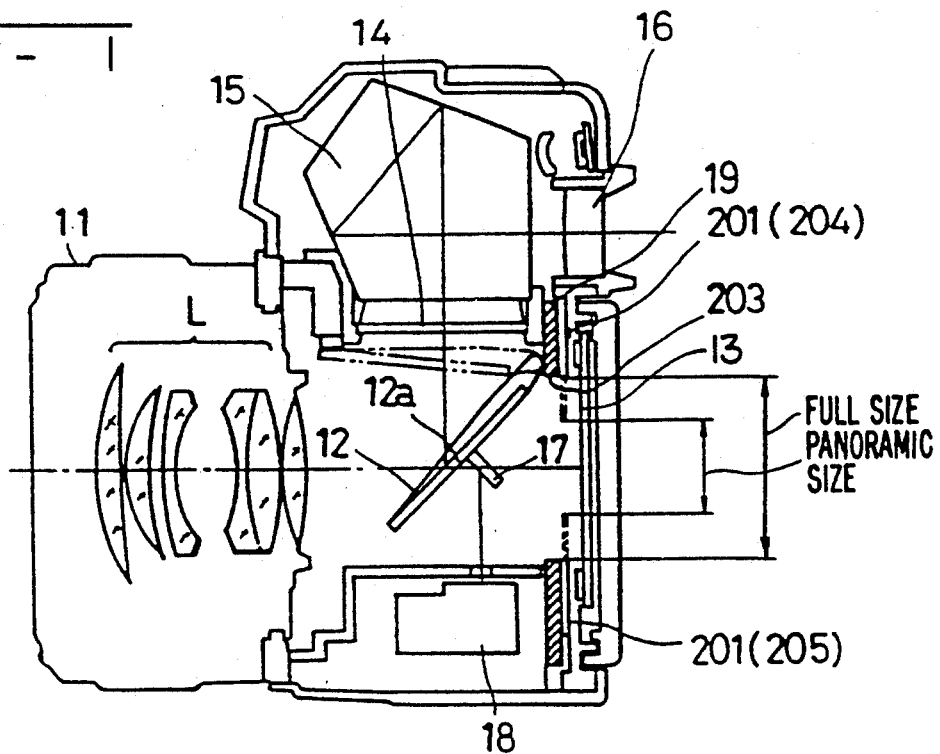
FIG. 1 is a sectional view of a main part of a single lens reflex camera to which the present invention is applied.
Figure 2:
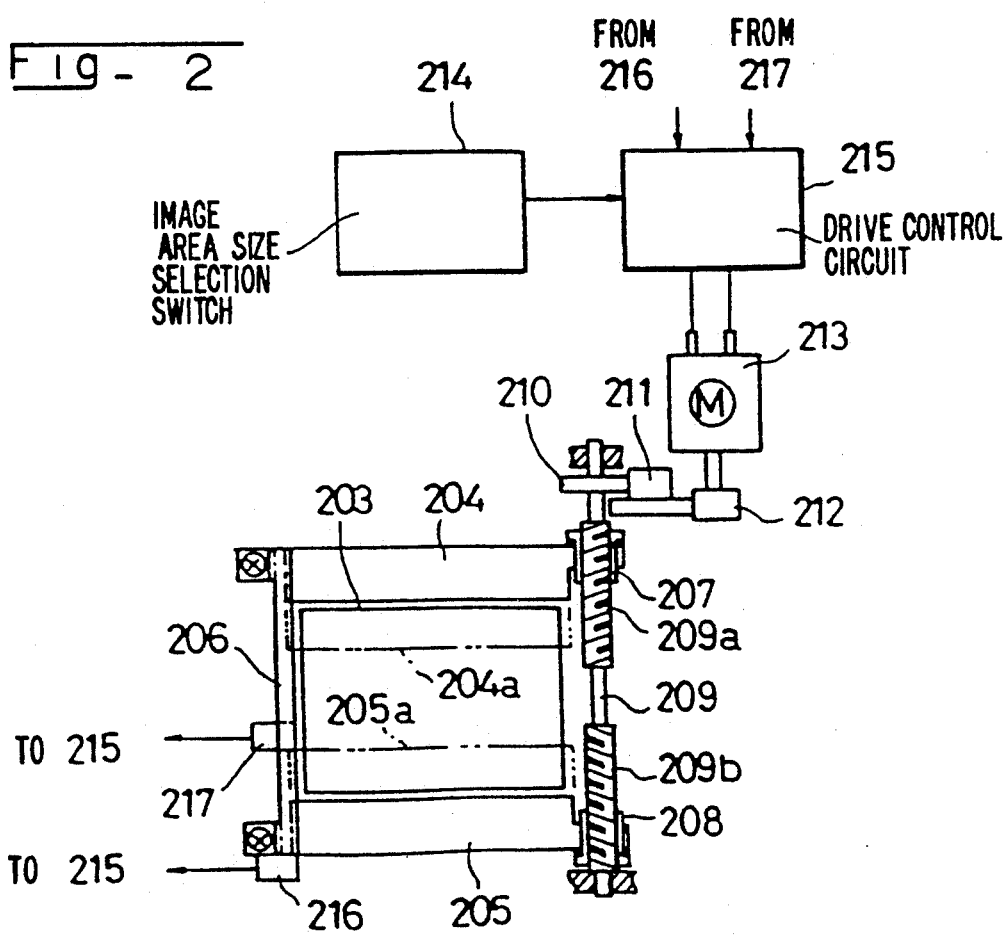
FIG. 2 is a schematic view of a picture plane varying device incorporated in a single lens reflex camera, as shown in FIG. 1.

With reference to FIG. 1, which shows a sectional view of a single lens reflex camera, to which the present invention is applied, object light transmitted through a taking lens 11 is converged onto a focusing plate 14 in a plane equivalent to an image area 13 through a mirror 12 to form an object image. A photographer observes the object image through a pentagonal prism 15 and an eyepiece (ocular lens system) 16. A part of the image light is transmitted through a half mirror portion 12a of the mirror 12 and reflected by an auxiliary mirror 17 toward an object distance measuring unit 18 per se known. The object distance measuring unit 18 is a multi-point measuring device which can detect a plurality of measuring points (zones) in the picture plane.

A pair of light intercepting plates 204 and 205, which constitute an image area size varying means 201, are provided between a shutter mechanism 19 and an aperture frame 203 to intercept beams of light corresponding to upper and lower portions the standard size of image area to thereby define a panoramic image area.

The light intercepting plates 204 and 205 are located outside the upper and lower edges of the aperture frame 203 which defines a 35 mm (full size) image area, respectively, and have a width which is greater than that of the aperture frame 203. The light intercepting plates 204 and 205 are supported at one end thereof by a guide plate 206 which extends in a direction parallel to the height of the image area (i.e., a direction perpendicular to the length of the light intercepting plates 204 and 205). The plates 204 and 205 slide in a direction parallel to the guide plate 206.

The light intercepting plates 204 and 205 are secured on the opposite ends thereof with nuts 207 and 208 having holes which are threaded in opposite directions.

Consequently, these nuts 207 and 208 are screw-engaged by respective threaded portions 209a and 209b of opposite directions of a screw shaft 209, which extends in parallel with the guide plate 206 on the side of the aperture frame 203 opposite the guide plate 206, so that when the screw shaft 209 is rotated in opposite directions, the light intercepting plates 204 and 205 move towards and away from each other to form the panoramic image area and the normal (standard) image area, respectively.

The screw shaft 209 is rotated by a motor 213 through reduction gear mechanisms 210, 211 and 212. The motor 213 is driven by a drive control circuit 215 in response to a control signal of an image area varying switch 214. The light intercepting plates 204 and 205 are driven to a normal image area size position or a panoramic image area size position in accordance with the operation of the image area selection switch 214. In the panoramic image area size position, lower and upper edges 204a and 205b of the upper and lower light intercepting plates 204 and 205 partly cover the image area, thereby defining the upper and lower edges of the panoramic image area. The normal image area size position and the panoramic image area size position of the light intercepting plates 204 and 205 are detected by respective limit switches 216 and 217. The drive control circuit 215 stops the motor in response to the detection signal.

The limit switches 216 and 217 serve also as stops, terminating the movement of the light intercepting plates 204 and 205.

Figure 3:
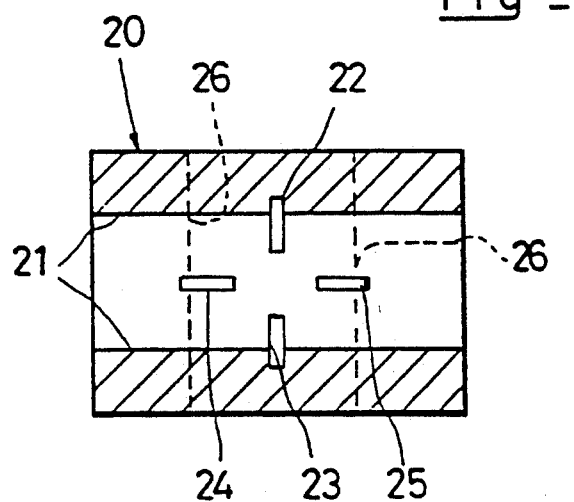
FIG. 3 is a plan view of an object distance measuring sensor provided in a single lens reflex camera, as shown in FIG. 1.

FIG. 3 shows a pattern of measuring elements of the object distance measuring unit 18, by way of example. The rectangular contour 20 corresponds to the large (standard) image area. The object distance measuring elements 22, 23, 24 and 25 are arranged in a cross-shape pattern having a center located at the center of the rectangle. Namely, in the cross-shape arrangement, the object distance measuring elements 22 and 23 are opposite each other in the vertical direction (minor side of the rectangle) and the object distance measuring elements 24 and 25 are opposite each other in the lateral direction (major side of the rectangle), respectively. The object distance measuring elements 22~25 receive light beams from the corresponding positions of the object to be taken and output the object distance data. The object distance measuring elements 22~25 can be made of CCD line sensors per se known.

The panoramic image area is designated by 21 in FIG. 3. When the image area is changed to the panoramic picture plane 21, the object distance measuring elements 22 and 23 partly protrude out of the panoramic image area 21. Consequently, if the object distance measurement is effected in the panoramic image area size position in the same way that it is effected in the standard image area size position, a measurement error may occur.

The present invention is aimed at eliminating the possibility of such a measurement error in the panoramic image area 21.

FIG. 4 shows a block diagram of a measuring apparatus according to an aspect of the present invention.

An object distance control means 31 includes an object distance measuring element selecting means 32 and an object distance calculating means 33. The object distance data output from the four object distance measuring elements 22 through 25 and the image area size data output from the image area size varying means 201 are input to the object distance measuring element selecting means 32.

The object distance measuring element selecting means 32 selects the desired object distance measuring elements in response to the image area size data from the image area size varying means 201. The object distance data from the selected object distance measuring elements is input to the object distance calculating means 33.

The object distance calculating means 33 performs the necessary calculation (predictor calculation) of the defocus amounts and direction thereof in accordance with the object distance data output from the object distance measuring element selecting means 32 in a predetermined order. Based on the defocus amounts thus obtained, the measuring zone, which includes the object to be focused, is determined. Then, a focusing lens is moved to the corresponding focal position.

The object distance calculating means 33 performs the calculation in accordance with different algorithms for the standard image area and the panoramic image area, based on the image area size data from the image area size varying means 201. This calculation operation will be discussed below with reference to FIG. 5.

In the standard image area all the object distance measuring elements 22 through 25 are selected and the calculation is carried out by a first multi-point measuring means A in accordance with the object distance data. In the panoramic image area, only two object distance measuring elements 24 and 25 are selected. Then, the calculation is carried out by a second multi-point measuring means B in accordance with the object distance data from the two selected object distance measuring elements 24 and 25. Thus, a precise object distance measurement, corresponding to the image area size, can be effected, resulting in precise focusing. The subject of the present invention is not limited to the above-mentioned algorithms for the panoramic image area and the standard image area (35 mm full size). For example, in the case of the 35 mm size of image area, the object distance data from the vertically aligned object distance measuring elements 22 and 23 is corrected by the object distance data from the horizontally aligned object distance measuring elements 24 and 25. On the other hand, in the case of the panoramic image area, only the object distance data (outputs), from the horizontally aligned object distance measuring elements 24 and 25, are averaged.

As can be seen from the foregoing, according to the present invention, if the image area is changed from the standard image area to the panoramic image area, precise focusing can be obtained, since calculation is carried out by the second multi-point measuring means B, which only uses the object distance measuring elements 24 and 25 corresponding to the panoramic image area.

In the embodiment illustrated in FIG. 3, if the full size image area is changed to a half-size image area 26, the horizontally aligned object distance measuring elements 24 and 25 are partly protruded from the half size image area 26. In this case, the vertically aligned object distance measuring elements 22 and 23 are selected, so that the object distance can be calculated by a third multi-point measuring means (not shown) similar to the second multi-point measuring means in accordance with the object distance data from the object distance measuring elements 22 and 23 only.

Figure 6:
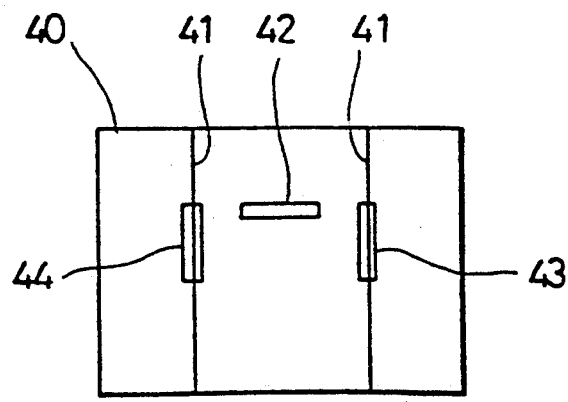

The number and arrangement (pattern) of the object distance measuring elements are not limited to those of the above-mentioned embodiment. For instance, as can be seen in FIG. 6, it is possible to arrange three object distance measuring elements 42, 43 and 44 in a generally inverted U-shape. In this alternative, the full size image area 40 is changed to the half-size image area 41. The object distance measuring elements 43 and 44 are partially located outside the half-size picture plane. Accordingly, only the object distance measuring element 42 is used to calculate the object distance.

Although the above discussion has been directed to a single lens reflex camera, the present invention is not limited thereto, and can be applied for example to a lens shutter type camera having a multi-point measuring device. Furthermore, the measuring system of the object distance measuring means and the arrangement and number of the split measuring zones are not limited to those in the illustrated embodiment. Furthermore, the image area size varying means 21 is not limited to that of the illustrated embodiment and can be replaced for example with a non-mechanical film restricting mechanism. The present invention can also be applied to an alternate camera in which pictures are always taken using the full size image area. In this situation the image area portion not contained in the panoramic image area is exposed to light upon winding of the film, or to a camera in which a photosensitive mark is used to indicate that panoramic photographing has been formed on the film.

As can be understood from the above discussion, according to the present invention, in a camera having a multi-point measuring means and an image area size varying means, since at least one object distance measuring element is selected in accordance with the selected image area size, and then the object distance is calculated in accordance with the corresponding algorithm, an appropriate object distance measurement can be effected, thus resulting in precise focusing, regardless of the image area size.

I claim:

1. An object distance measuring apparatus of a camera, comprising:
   image area size varying means for varying a size of an image area;
   multi-point measuring means having a plurality of object distance measuring elements for measuring object distances of an object in a large image area at different measuring points; and
   calculating means for calculating the object distance in accordance with the object distance data from the object distance measuring elements, which are contained in the small image area, and excluding the outputs of the object distance measuring elements, which protrude from the small image area, from a calculation of the object distance,
   wherein, when a small image area is selected by the image area size varying means, at least a part of at least one of the object distance measuring elements protrudes from the small image area.

2. The object distance measuring apparatus of claim 1, wherein the image area size varying means comprises a light intercepting plate provided between a shutter mechanism and an aperture frame to intercept beams of light, the light intercepting plate being movable between portions defining the large image area and the small image area.

3. An object distance measuring apparatus of a camera, comprising:
   image area size varying means for varying a size of an image area;
   multi-point measuring means having a plurality of object distance measuring elements for measuring object distances of an object in a large image area at different measuring points;
   object distance measuring element selecting means for selecting a plurality of outputs of said object distance measuring elements of said multi-point measuring means in accordance with the size of said image area selected by said image area size varying means; and
   calculating means for calculating said object distance in accordance with different predetermined algorithms, based on object distance data from said object distance measuring elements selected in accordance with said selected image area size, wherein when a small image area is selected by said image area size varying means, at least a part of at least one of said object distance measuring elements protrudes from said small image area and said multi-point measuring means excludes an output of said object distance measuring element, which partly protrudes from said small image area, from a calculation of said object distance.

4. The object distance measuring apparatus of claim 1, wherein the image area size varying means comprises a light intercepting plate provided between a shutter mechanism and an aperture frame to intercept beams of light, the light intercepting plate being movable between positions defining the large image area and a small image area.

5. An object distance measuring apparatus according to claim 1, wherein the image area is of a rectangular shape, and wherein the multi-point measuring means has four object distance measuring elements which are arranged in a generally cross shape having a center located at a center of a rectangular image area.

6. An object distance measuring apparatus according to claim 5, wherein two of the four object distance measuring elements are horizontally aligned and partly protruded from the small image area.

7. An object distance measuring apparatus according to claim 5, wherein the small image area is a panoramic picture plane.

8. An object distance measuring apparatus according to claim 5, wherein the two of the four object distance measuring elements are vertically aligned and partly protrude from the small image area.

9. An object distance measuring apparatus according to claim 5, wherein the small image area is a half-size image area.

10. An object distance measuring apparatus according to claim 1, wherein the image area is of a rectangular shape, and wherein the multi-point measuring means has two horizontally aligned object distance measuring elements, and are object distance measuring element located at a center of the rectangular image area in a lateral direction.

11. An object distance measuring apparatus according to claim 10, wherein the two horizontally aligned object distance measuring elements partly protrude from the small image area.

12. An object distance measuring apparatus according to claim 11, wherein the small image area is a half-size image area.

13. An object distance measuring apparatus according to claim 1, wherein the camera is a single lens reflex camera.

* * * * *

UNITED STATES PATENT AND TRADEMARK OFFICE
CERTIFICATE OF CORRECTION

PATENT NO. : 5,307,111
DATED : April 26, 1994
INVENTOR(S) : Hiroshi KUREI

It is certified that error appears in the above-indentified patent and that said Letters Patent is hereby corrected as shown below:

At column 6, line 30 (claim 4, line 6) change "positions" to ---portions---.

At column 6, line 33 (claim 5, line 2) change "1" to ---3---.

At column 6, line 52 (claim 10, line 2) change "1" to ---3---.

At column 6, line 55 (claim 10, line 5) change "are" to ---one---.

At column 6, line 66 (claim 13, line 2) change "1" to ---3---.

Signed and Sealed this

Sixth Day of June, 1995

Attest:

BRUCE LEHMAN

Attesting Officer    Commissioner of Patents and Trademarks